(12) United States Patent
Breedy

(10) Patent No.: US 11,336,469 B2
(45) Date of Patent: May 17, 2022

(54) CABLE ISOLATION SYSTEM

(71) Applicant: Dell Products L.P., Round Rock, TX (US)

(72) Inventor: Andrew Breedy, Mitchelstown (IE)

(73) Assignee: Dell Products L.P., Round Rock, TX (US)

( * ) Notice: Subject to any disclaimer, the term of this patent is extended or adjusted under 35 U.S.C. 154(b) by 128 days.

(21) Appl. No.: 16/713,673

(22) Filed: Dec. 13, 2019

(65) Prior Publication Data

US 2021/0184873 A1 Jun. 17, 2021

(51) Int. Cl.
*H04L 12/12* (2006.01)
*H04L 29/08* (2006.01)
*H04L 67/1097* (2022.01)

(52) U.S. Cl.
CPC .......... *H04L 12/12* (2013.01); *H04L 67/1097* (2013.01)

(58) Field of Classification Search
CPC ............................ H04L 12/12; H04L 67/1007
See application file for complete search history.

(56) References Cited

U.S. PATENT DOCUMENTS

| 2005/0001179 | A1* | 1/2005 | Gisler | H04B 10/802 |
| | | | | 250/551 |
| 2009/0168462 | A1* | 7/2009 | Schopfer | H02M 3/33523 |
| | | | | 363/21.01 |
| 2009/0256527 | A1* | 10/2009 | Welsch | G01R 33/091 |
| | | | | 320/136 |
| 2011/0059695 | A1* | 3/2011 | Martch | H01Q 1/247 |
| | | | | 455/41.1 |
| 2012/0212306 | A1* | 8/2012 | Richley | H01P 7/06 |
| | | | | 333/24 R |
| 2013/0043048 | A1* | 2/2013 | Joseph | E21B 17/028 |
| | | | | 166/381 |
| 2014/0038462 | A1* | 2/2014 | Coffey | G02B 6/3817 |
| | | | | 439/620.15 |
| 2019/0163496 | A1* | 5/2019 | Walker | G06F 9/4408 |
| 2020/0076702 | A1* | 3/2020 | Pitta | H04L 41/12 |

* cited by examiner

*Primary Examiner* — Christopher B Robinson
(74) *Attorney, Agent, or Firm* — Joseph Mencher

(57) ABSTRACT

A cable isolation system that includes a cable that includes a first end, a second end, and a cable transmission medium that extends between the first end and the second end. The cable isolation system also includes a first connector that is located on the first end of the cable, that is coupled to the at least one cable transmission medium, and a second connector that is located on the second end of the cable, that is coupled to the at least one cable transmission medium. A cable isolation device is provided in at least one of the cable, the first connector, or the second connector and transitions between a non-isolated state that allows data to be transmitted via the cable transmission medium, and an isolated state that prevents data from being transmitted via the cable transmission medium.

20 Claims, 14 Drawing Sheets

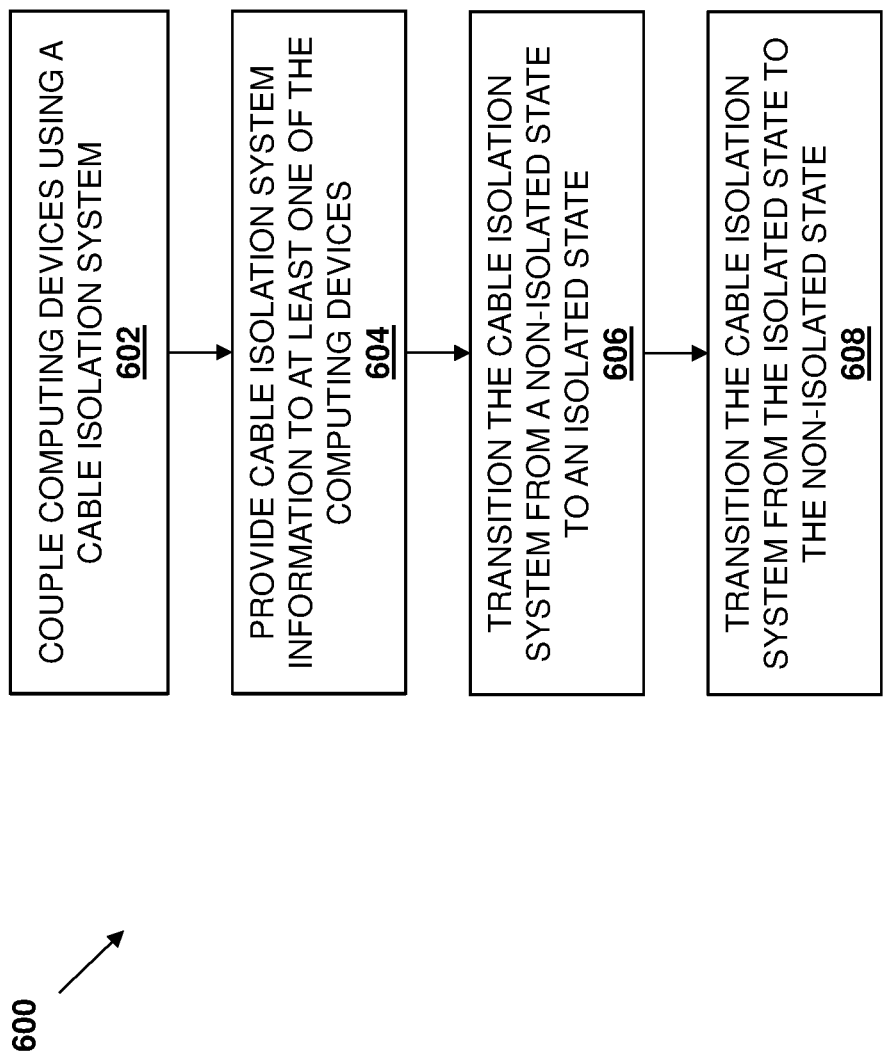

CABLE ISOLATION SYSTEM

BACKGROUND

The present disclosure relates generally to information handling systems, and more particularly to isolating a cable and/or an information handling system to which a cable is connected.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, networking devices, storage devices, and/or other computing devices known in the art, are often coupled together via cables to form a networked system. For example, a networking cable such as, for example, an Ethernet cable, often provides each connection needed between such computing devices in the networked system. In some instances, an administrator may desire to isolate a computing device that is included in the networked system. For example, the computing device may have been compromised by a virus or a hacking attempt, and thus may need to be isolated from the other computing devices in the networked system as quickly as possible. Conventionally, an administrator has to physically locate the computing device that the administrator would like to isolate from the networked system and physically shut down that computing device, disconnect the networking cables that couple the computing device to the networked system, and/or remotely turn off ports on the computing device that couple the computing device to the networked system. However, computing devices in networked systems may be remote or difficult to locate in a timely manner. Furthermore, in situations where a computing device is compromised, powering down the computing device to remove it from the networked system may run the risk that the computing device will then fail to boot correctly. Further still, while an administrator may remotely turn off ports on the computing device to isolate that computing device from the networked system, a compromised computing device may have its ports turned back on and reconnected to the networked system by those that have achieved unauthorized control of that computing device.

Accordingly, it would be desirable to provide an improved cable isolation system that addresses the issues discussed above.

SUMMARY

According to one embodiment, an Information Handling System (IHS) network includes a first device; a second device; a cable that includes a first end, a second end that is opposite the cable from the first end, and at least one cable transmission medium that extends between the first end and the second end and that is configured to transmit data; a first connector that is located on the first end of the cable and that is coupled to the first device; a second connector that is located on the second end of the cable and that is coupled to the second computing device; and a cable isolation device that is provided in at least one of the cable, the first connector, or the second connector, wherein the cable isolation device is configured transition between: an isolated state that allows data to be transmitted between the first device and the second device; and a non-isolated state that prevents data from being transmitted between the first device and the second device.

BRIEF DESCRIPTION OF THE DRAWINGS

FIG. 6 is a flow chart illustrating an embodiment of a method for isolating a cable in a networked system.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
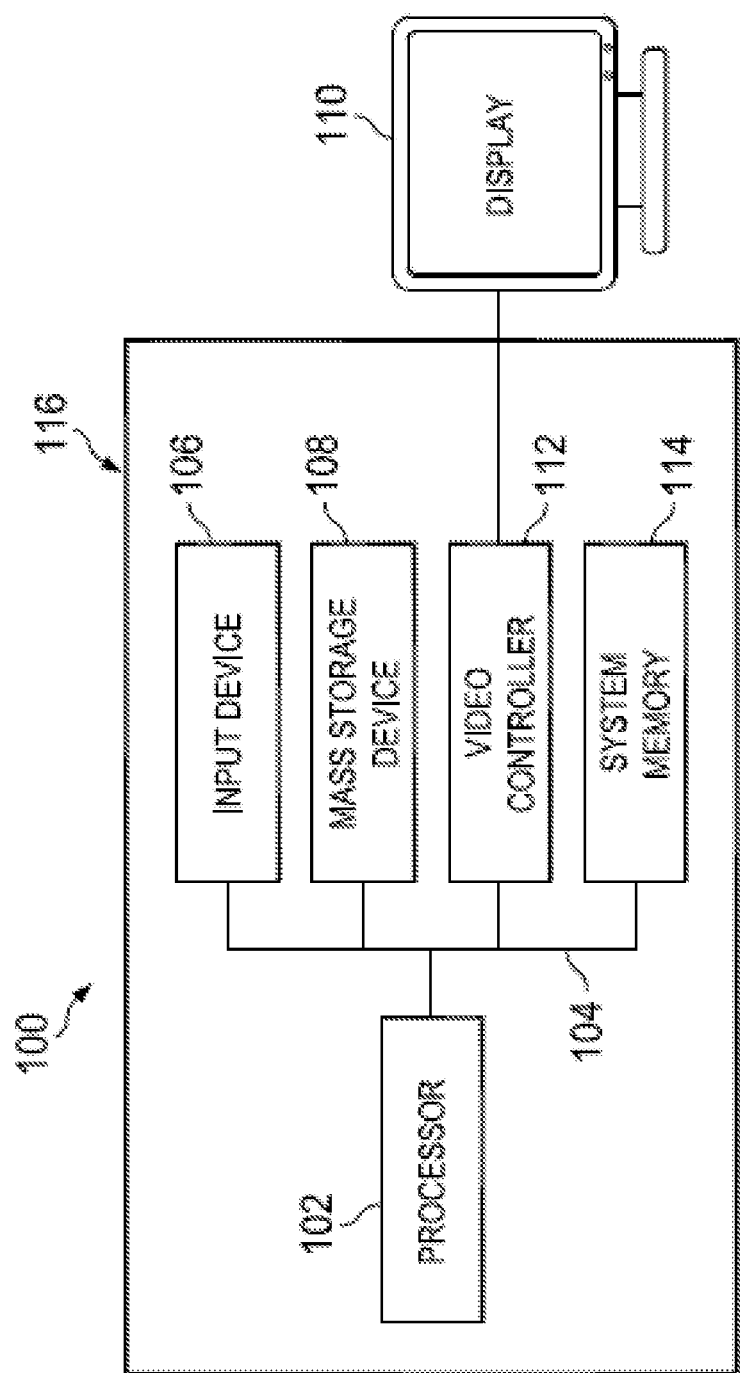
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
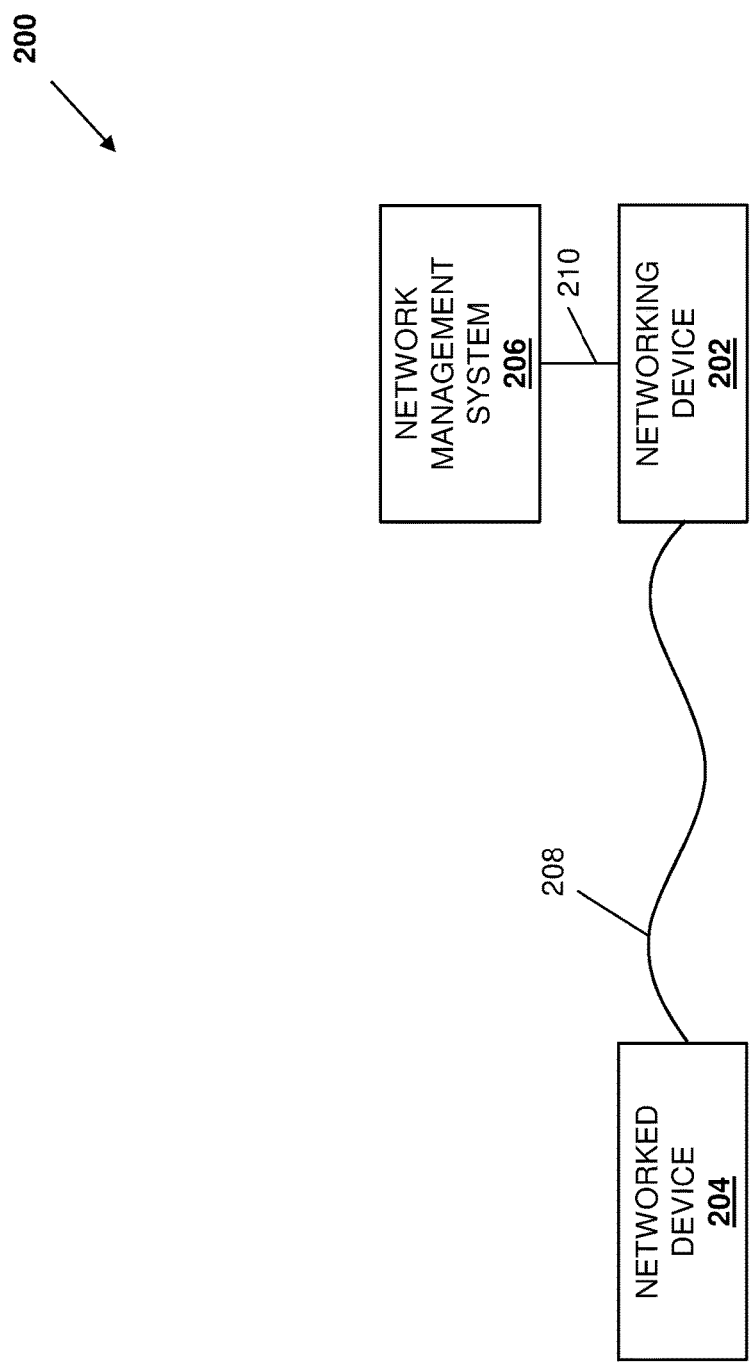
FIG. 2 is a schematic view illustrating an embodiment of a networked system.

Referring now to FIG. 2, an embodiment of a networked system 200 is illustrated. In the illustrated embodiment, the networked system 200 includes a networking device 202, a networked device 204, and a network management device 206. One of skill in the art in possession of the present disclosure will recognize that the networked system 200 in the illustrated embodiment is a simplified example of a datacenter, and that a variety of additional and/or other types of computing devices may be included in the networked system 200 while remaining within the scope of the present disclosure.

In an embodiment, the networking device 202 may be provided by the IHS 100 discussed above with reference to FIG. 1, and/or may include some or all of the components of the IHS 100. For example, the networking device may include a switch device, a router device, a gateway device, and/or any of a variety of other computing devices that would be apparent to one of skill in the art in possession of the present disclosure. However, while illustrated and discussed as a networking device 202, one of skill in the art in possession of the present disclosure will recognize that networking devices provided in the networked system 200 may include any computing device that may be configured to operate similarly as the networking device 202 discussed below.

In an embodiment, the networked device 204 may be provided by the IHS 100 discussed above with reference to FIG. 1, and/or may include some or all of the components of the IHS 100. For example, the networked device 204 may include a server device, a storage system/device, a desktop computing device, a laptop/notebook computing device, a tablet computing device, a mobile phone, and/or any of a variety of other computing devices that would be apparent to one of skill in the art in possession of the present disclosure. The networking device 202 and the networked device 204 may be coupled together by a cable isolation system 208. While a single cable isolation system 208 is illustrated in FIG. 2, one of skill in the art in possession of the present disclosure will recognize that the networked device 204 and the networking device 202 may be coupled together by additional cable isolation systems that operate similarly to the cable isolation system 208 while remaining within the scope of the present disclosure as well. Furthermore, while a single networked device 204 is illustrated as being coupled to the networking device 202 in FIG. 2, one of skill in the art in possession of the present disclosure will recognize that the networking device(s) 202 may (and typically will) couple to many more devices (e.g., in a datacenter) while remaining within the scope of the present disclosure, and each of those devices may be coupled to the networking device 202 via a cable isolation system as well.

In the illustrated embodiment, the network management system 206 is coupled to the networking device 202 via a management cable 210. In an embodiment, the network management system 206 may be provided by the IHS 100 discussed above with reference to FIG. 1, and/or may include some or all of the components of the IHS 100. In specific examples, the network management system 206 may be provided by server devices, desktop computing devices, laptop/notebook computing devices, tablet computing devices, mobile phones, and/or any other device that may provide the network management system functionality discussed below. While a management cable 210 is illustrated in FIG. 2 as directly coupling the networking device 202 to the network management system 206, one of skill in the art in possession of the present disclosure will recognize that management cable(s) may couple the network management system 206 to the networked device 204, and/or the network management system 206 may be coupled to the networking device 202 and/or the networked device 204 via a variety of different devices, systems, and/or networks, while remaining within the scope of the present disclosure as well. Furthermore, while the networking device 204 and the networked device 202 are described as being coupled together by the cable isolation system 208, one of skill in the art in possession of the present disclosure will recognize that any computing devices coupled together by a cable isolation system provided according to the teachings of the present disclosure will benefit from the teachings of the present disclosure and thus are envisioned as falling within the scope of the present disclosure as well. Furthermore, while a specific networked system 200 has been illustrated and described, one of skill in the art in possession of the present disclosure will recognize that the networked system of the present disclosure may include a variety of components and component configurations while remaining within the scope of the present disclosure as well.

Figure 3:
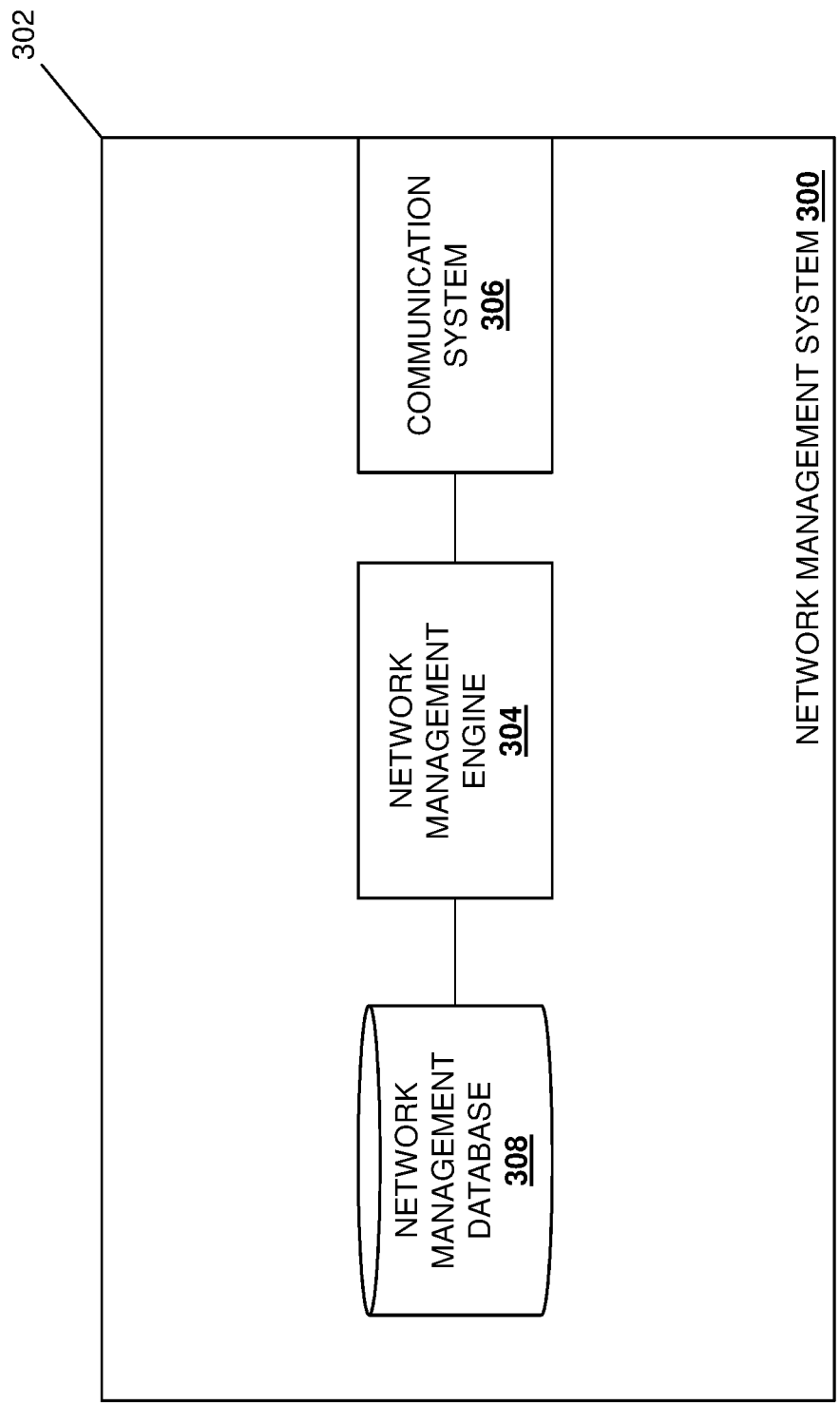
FIG. 3 is a schematic view illustrating an embodiment of a network management system that may be provided in the networked system of FIG. 2.

Referring now to FIG. 3, an embodiment of a network management system 300 is illustrated that may provide the network management system 206 discussed above with reference to FIG. 2. As such, the network management system 300 may be provided by the IHS 100 discussed above with reference to FIG. 1 and/or may include some or all of the components of the IHS 100. In the illustrated embodiment, the network management system 300 includes a chassis 302 that houses the components of the network management system 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a network management engine 304 that is configured to perform the functionality of the network management engines and/or network management systems discussed below.

The chassis 302 may also house a communication system 306 that is coupled to the network management engine 304 (e.g., via a coupling between the communication system 406 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. The chassis 302 may also house a storage system (not illustrated, but which may include the storage 108 discussed above with reference to FIG. 1) that is coupled the network management engine 304 (e.g., via a coupling between the storage system and the processing system) and that includes a network management database 308 that is configured to store any of the information utilized by the network management engine 304 as discussed below. For example, the network management database 308 may store mappings of computing devices in the network that are coupled together by a cable isolation system, as well as other information such as, for example, networking device port identifiers, networked device identifiers, cable isolation system identifiers, cable isolation capability indicators, cable isolation system statuses, and/or any other networking device information, networked device information, and/or cable information associated with cables and/or cable isolation systems that would be apparent to one of skill in the art in possession of the present disclosure. While a specific network management system 300 has been illustrated, one of skill in the art in possession of the present disclosure will recognize that network management systems (or other devices operating according to the teachings of the present disclosure in a manner similar to that described below for the network management system 300) may include a variety of components and/or component configurations for providing conventional network management functionality, as well as the functionality discussed below, while remaining within the scope of the present disclosure as well.

Figure 4:
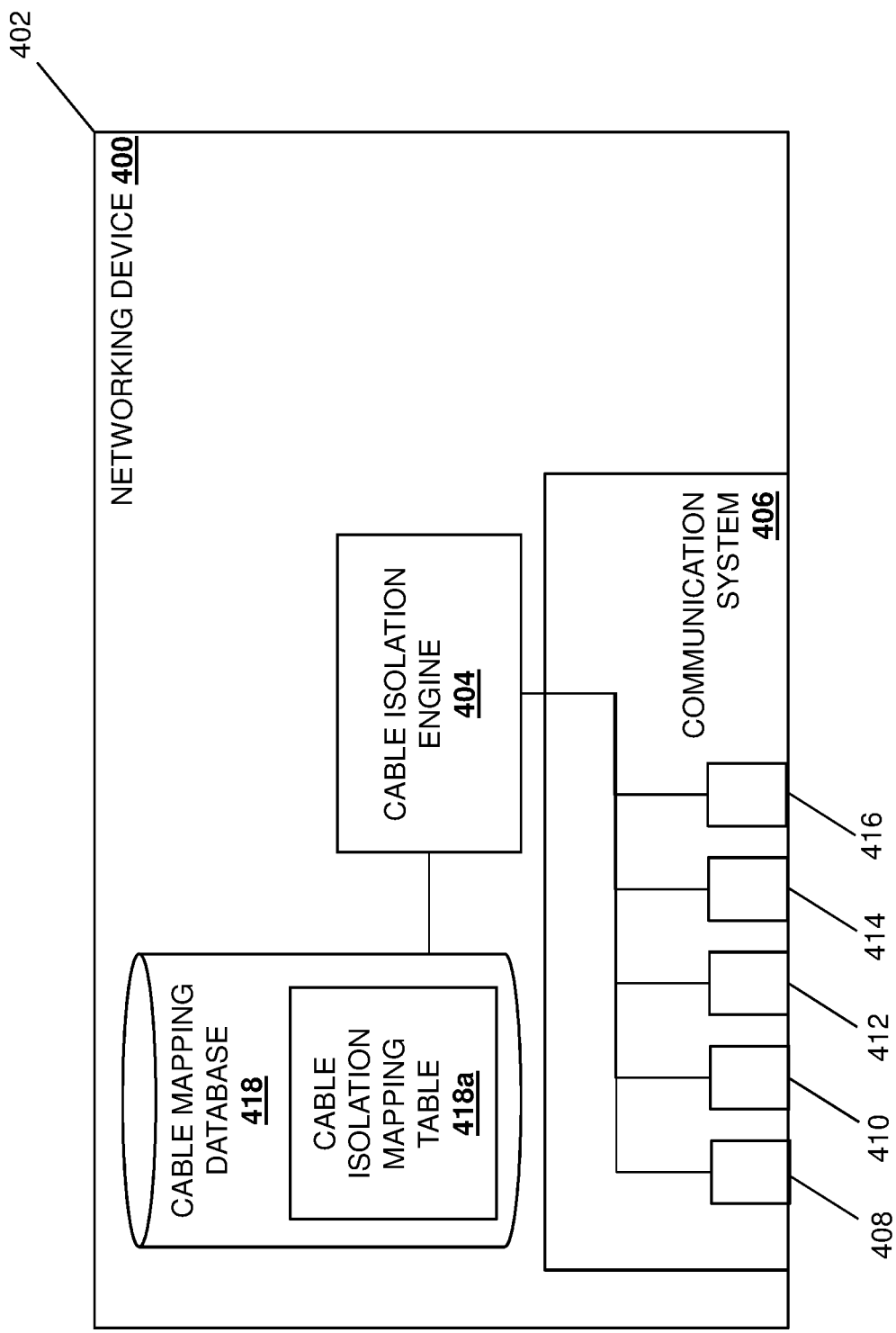
FIG. 4 is a schematic view illustrating an embodiment of a networking device that may be provided in the networked system of FIG. 2.

Referring now to FIG. 4, an embodiment of a networking device 400 is illustrated that may be the networking device 202 discussed above in reference to FIG. 2. However, one of skill in the art in possession of the present disclosure will recognize that the networking device 400 may be provided by any of a variety of computing devices (e.g., the functionality of the networking device 400 discussed below may be provided for the networked device 204 discussed above in reference to FIG. 2 as well.) In the illustrated embodiment, the networking device 400 includes a chassis 402 that houses the components of the networking device 400, only some of which are illustrated below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a cable isolation engine 304 that is configured to perform the functionality of the cable isolation engines, computing devices, and/or networking devices discussed below. In addition to the cable isolation functionality discussed below, the instructions may also cause the processing system to provide a networking device engine that is configured to perform conventional networking device and/or computing device functionality for the networking devices and/or computing devices discussed below (e.g., such functionality may include switching operations, application operations, and/or other conventional operations that would be apparent to one of skill in the art in possession of the present disclosure).

The chassis 402 may also house a communication system 406 that is coupled to the cable isolation engine 404 (e.g., via a coupling between the communication system 406 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. For example, the communication system 406 may include at least one networking device port such as, for example, the ports 408, 410, 412, 414, and up to 416 illustrated in FIG. 4. In an embodiment, the networking device ports 408-416 may be configured to couple to connectors provided on the cable isolation system 208, and/or other cable connectors that would be apparent to one of skill in the art in possession of the present disclosure. In some embodiments, the networking device ports 408-416 may be configured to couple to the management cable 210 discussed above with reference to FIG. 2 as well. In a specific example, at least one of the ports 408-416 included in the communication system 406 may provide a management port that may be configured to couple via the management cable 210 to the network management device 206.

The chassis 402 may also house a storage system (not illustrated, but which may include the storage 108 discussed above with reference to FIG. 1) that is coupled the cable isolation engine 404 (e.g., via a coupling between the storage system and the processing system) and that includes a cable mapping database 418 that is configured to store any of the information utilized by the cable isolation engine 404 as discussed below. For example, the cable mapping database 418 may store an cable isolation mapping table 418a that may include networking device port identifiers, networked device identifiers, cable identifiers, cable isolation capability indicators, cable isolation system statuses, and/or any other networking device information, networked device information (e.g., for a networked device coupled to the networking device 400), and/or cable information (e.g., for cables and/or cable isolation systems coupled to the networking device 400) that would be apparent to one of skill in the art in possession of the present disclosure. Furthermore, while a specific networking device 400 has been illustrated, one of skill in the art in possession of the present disclosure will recognize that networking devices (or other devices operating according to the teachings of the present disclosure in a manner similar to that described below for the networking device 400) may include a variety of components and/or component configurations for providing conventional networking device functionality, as well as the functionality discussed below, while remaining within the scope of the present disclosure as well.

Referring now to FIGS. 5A-5E, an embodiment of a cable isolation system 500 is illustrated that may provide the cable isolation system 208 discussed above with reference to FIG. 2. In the illustrated embodiment, the cable isolation system 500 includes a cable 501 having a cable body 502 that is elongated and that includes a first end 502*a* and a second end 502*b* that is located opposite the cable body 502 from the first end 502*a*. The cable body 502 may include a cable transmission medium 503 such as a conductive transmission medium (e.g., copper wire(s)), a fiber optic transmission medium (e.g., fiber optic cable(s)/wire(s)), a wireless transmission medium (e.g., wireless transceivers that communicate via a wireless protocol that operate as a logical cable), and/or a variety of other cable transmission mediums that would be apparent to one of skill in the art in possession of the present disclosure. Furthermore, the cable transmission medium 503 may be surrounded by a variety of different types of dielectric layers, shielding layers, and/or other protective layers that would be apparent to one of skill in the art in possession of the present disclosure. A connector 504 is located on the first end 502*a* of the cable body 502 and connected to the cable transmission medium 503 in the cable body 502, and a connector 506 is located on the second end 502*b* of the cable body 502 and connected to the cable transmission medium 503 in the cable body 502.

In specific examples, the connectors 504 and 506 may include Ethernet cable connectors that are configured to couple to Ethernet ports, Fibre Channel connectors that are configured to couple to Fibre Channel ports, Small Form-factor Pluggable (SFP) connector types (e.g., SFP, QSFP, SFP+, etc.) that are configured to couple to SFP ports, and/or a variety of other types of connectors known in the art that are configured to couple to communication ports on a computing device (e.g., the networking device 202, the networked device 204, etc.). In different embodiments, the cable 501 may include different lengths (e.g., 5 meters, 10 meters, 25 meters, 50 meters, etc.) and quality characteristics such as a category characteristic (e.g., category 3, 5, 5e, 6, 6a, and/or 7 for Ethernet cables), a connector characteristic (RJ-45 or GigaGate45 (GG45) for Ethernet connectors), a transmission rate characteristic (e.g., 1 GB, 10 GB, etc.), a cable transmission medium characteristics (e.g., unshielded twisted pair, shielded twisted pair, etc.), and/or a variety of other cable quality characteristics that would be apparent to one of skill in the art in possession of the present disclosure.

The cable isolation system 500 also includes one or more cable isolation devices 508. In the illustrated embodiment, a cable isolation device 508 is included only in the connector 504. However, in other embodiments, the cable isolation device 508 may be included with the connector 504, in the cable 501, and/or with the connector 506. As such, in some embodiments, more than one cable isolation device 508 may be provided in the cable isolation system 500 (e.g., in each connector 504 and 506, as well as in the cable body 512.) In the embodiments discussed below, the cable isolation device 508 is configured to transition between a non-isolated state that allows data to be transmitted between the connector 504 and the connector 506 via the cable transmission medium 503, and an isolated state that prevents data from being transmitted between the connector 504 and the connector 506 via the cable transmission medium 503. For example, the cable isolation device 508 may be a switch, a relay, a solenoid, a transistor, a fuse, and/or any other cable isolation device that couples the connectors and/or portions of the cable transmission medium 503 together in a manner that permits data to be transmitted between the connector 504 and the connector 506 via the cable transmission medium 503 when the cable isolation device in a non-isolated state, while decoupling the connectors and/or portions of the cable transmission medium 503 to prevent data from being transmitted between the connector 504 and the connector 506 via the cable transmission medium 503 when the cable isolation device is in a non-isolated state. While discussed as allowing the transmission of data or preventing the transmission of data via the cable isolation system 500, one of skill in the art in possession of the present disclosure will recognize that the cable transmission medium 503 may provide power instead of data, or may provide both power and data, with the functionality of the cable isolation device allowing or preventing the transmission of that data and/or power in substantially the same manner as discussed below.

Figure 5A:
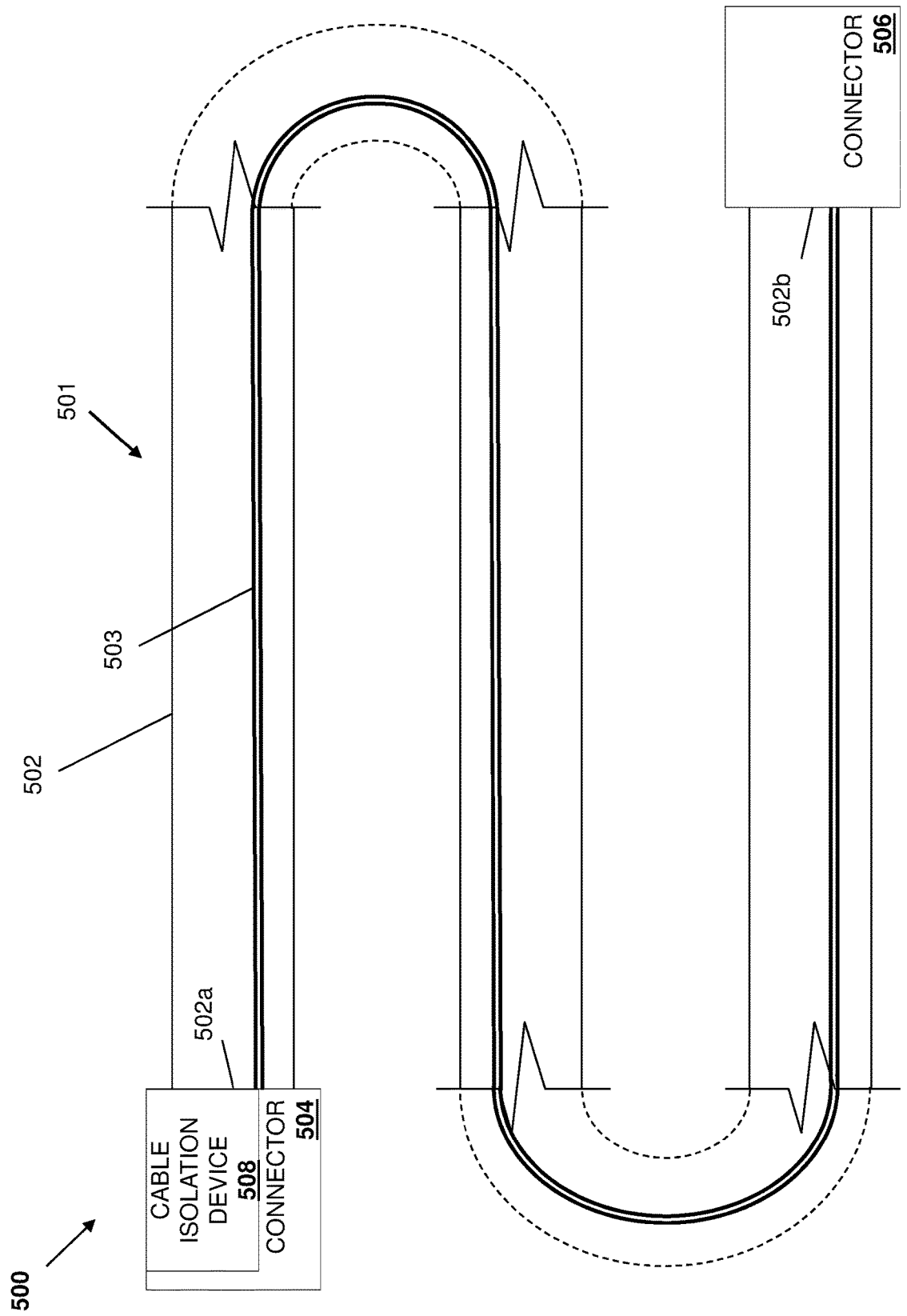
FIG. 5A is a schematic view illustrating an embodiment of a cable isolation system that may be provided in the networked system of FIG. 2.
Figure 5B:
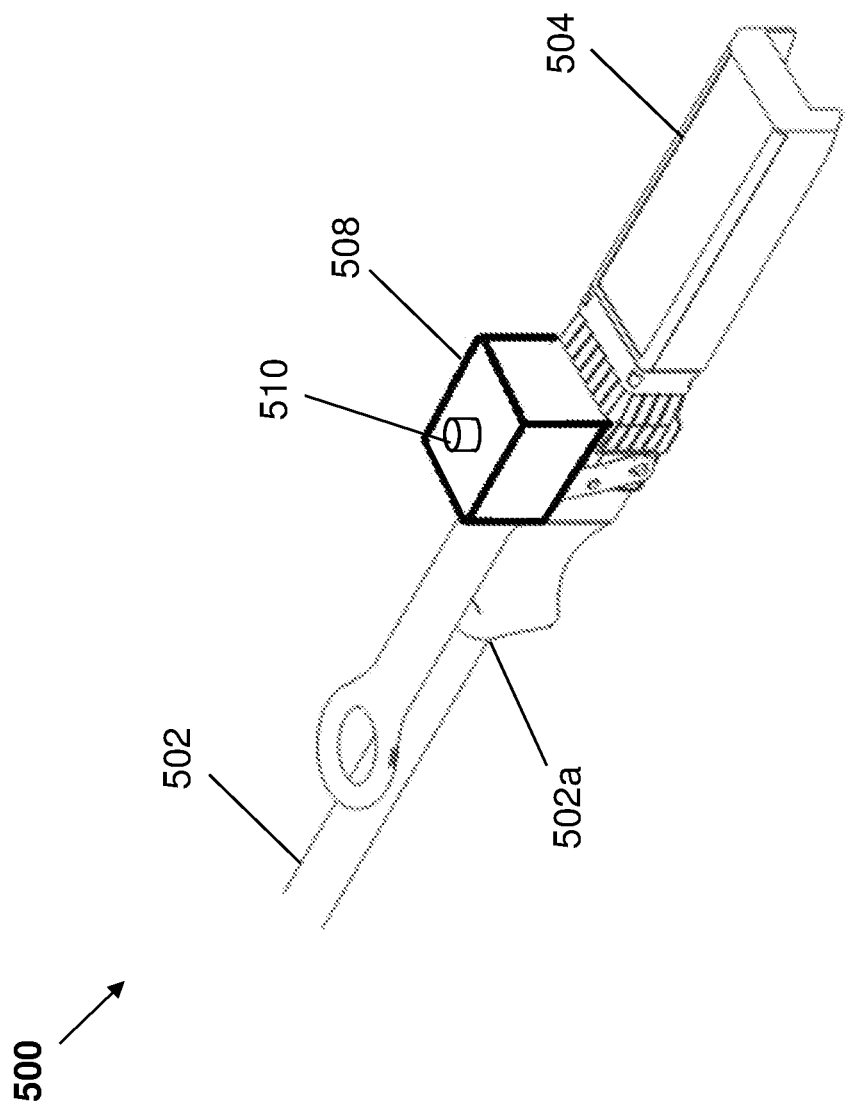
FIG. 5B is a perspective view illustrating an embodiment of a cable isolation device on the cable isolation system of FIG. 5A.
Figure 5C:
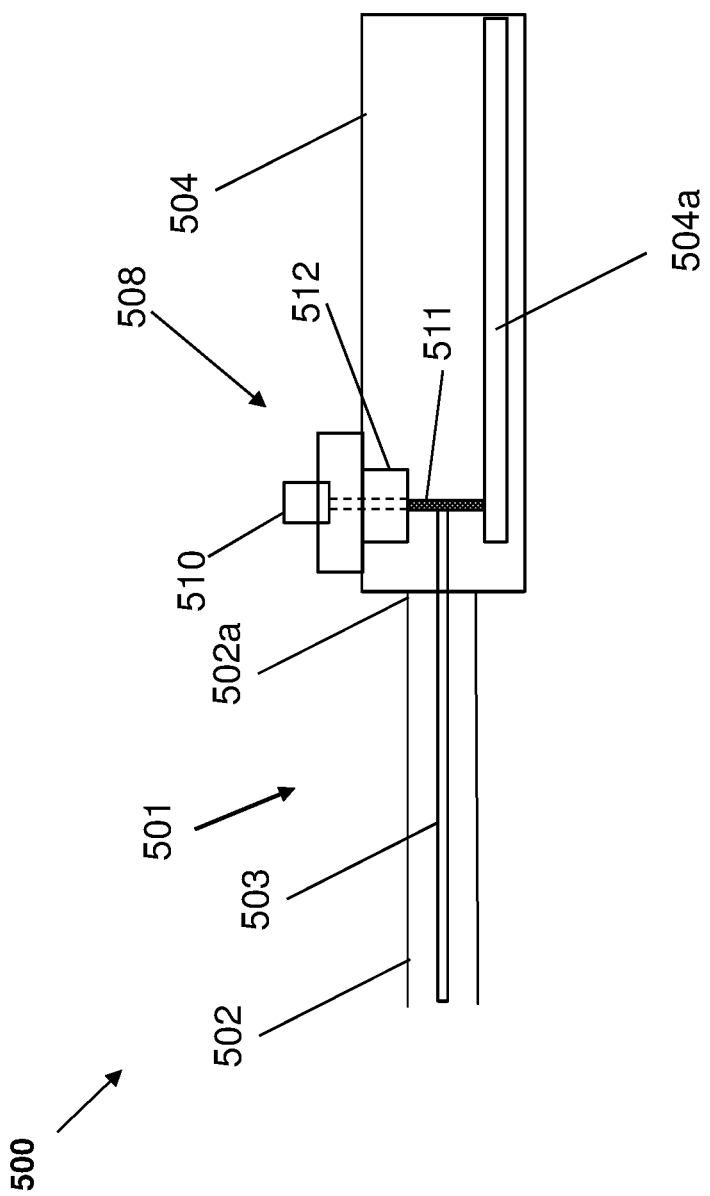
FIG. 5C is a cross-sectional side view illustrating an embodiment of the cable isolation device of FIG. 5B.
Figure 5D:
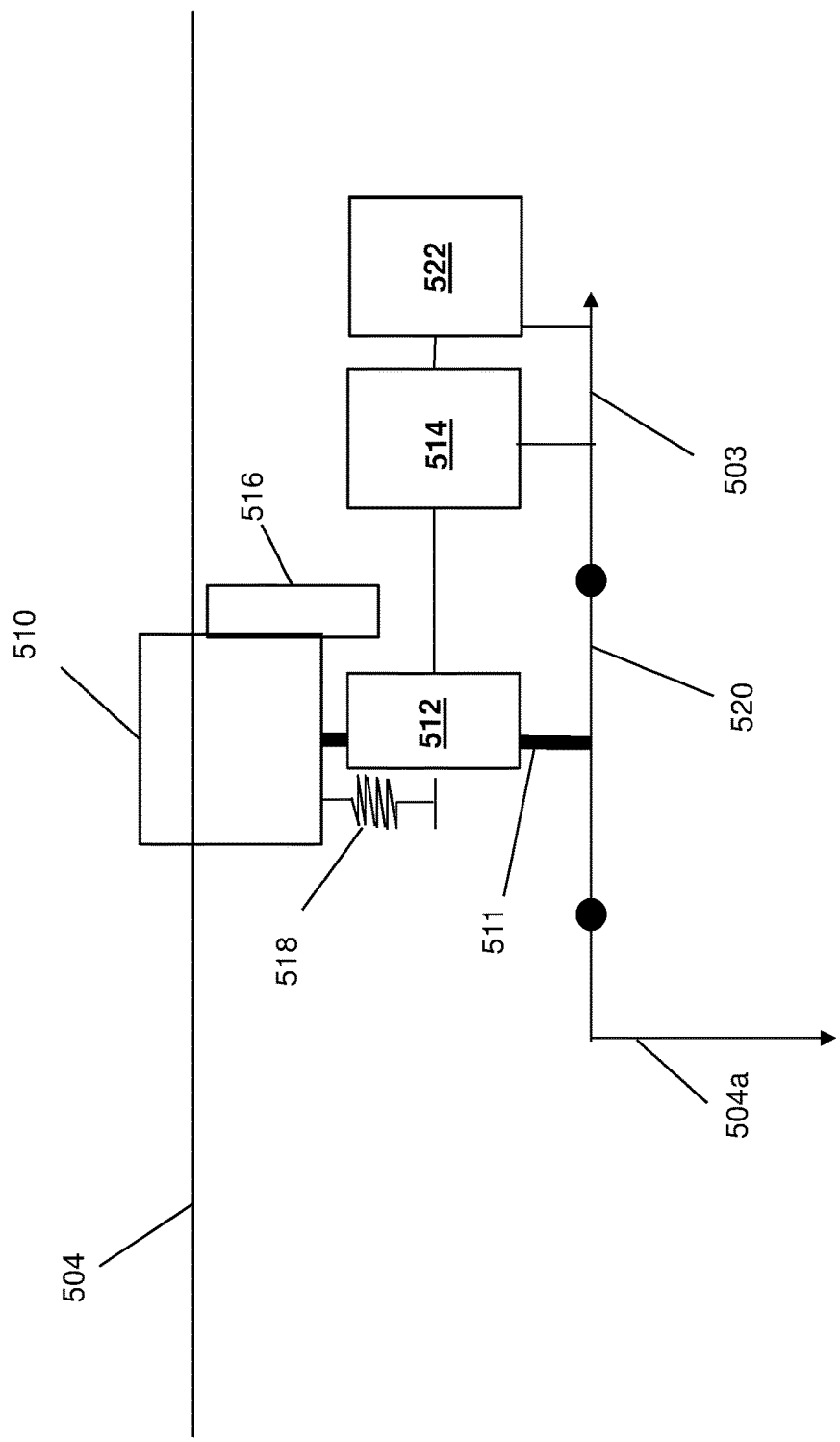
FIG. 5D is a schematic view illustrating an embodiment of the cable isolation device of FIGS. 5B and 5C in a first state.
Figure 5E:
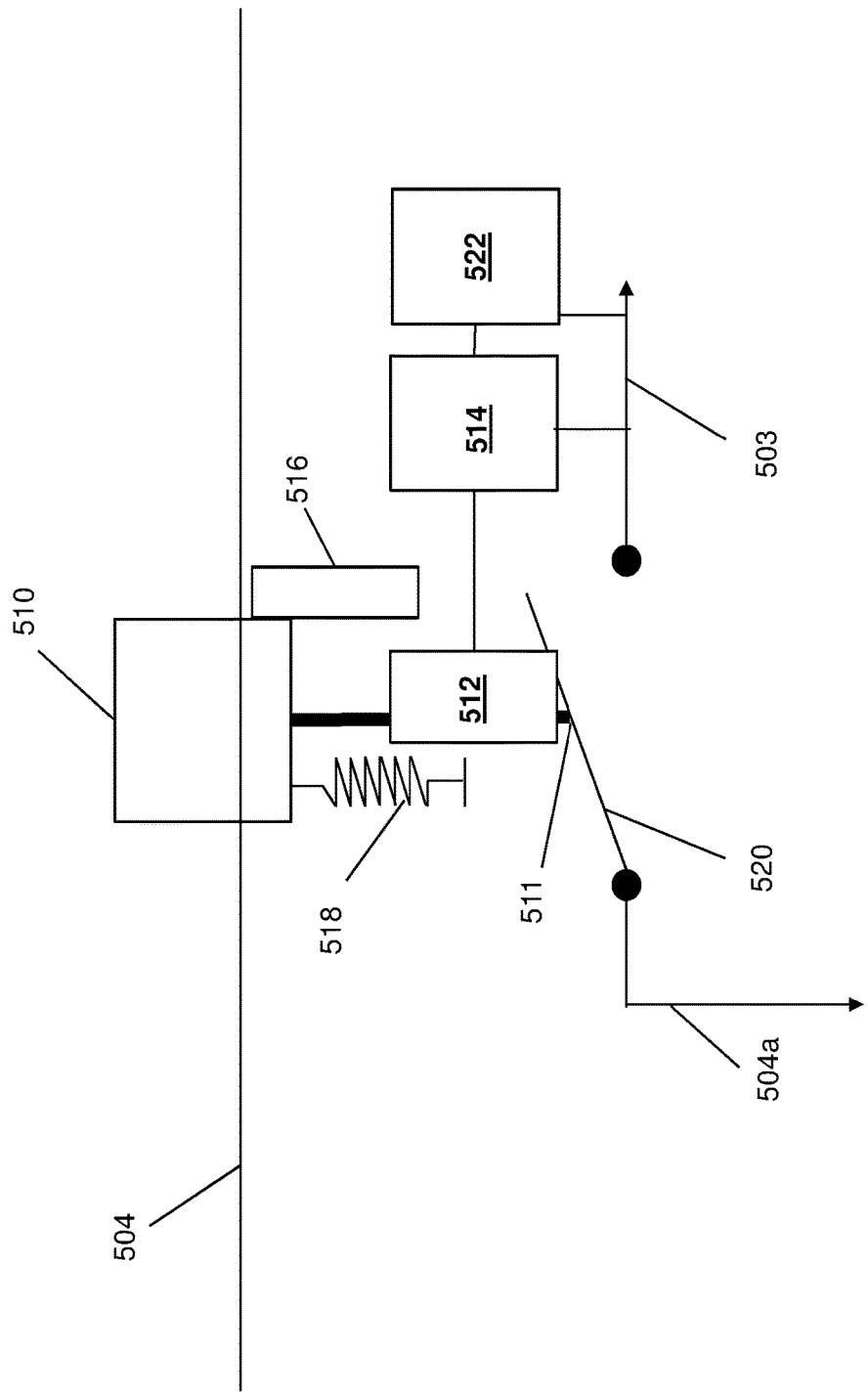
FIG. 5E is a schematic view illustrating an embodiment of the cable isolation device of FIG. 5D in a second state.

Referring now to FIGS. 5B-5E, an embodiment of the connector 504 is illustrated that provides an example of a cable isolation device 508, and one of skill in the art will recognize that the cable isolation device 508 may be provided with the connector 506 and/or with the cable 501 while remaining within the scope of the present disclosure as well. In the embodiment illustrated in FIG. 5D, a coupling 511 is provided between an cable isolation actuator 510 and a switch 520 that is configured to cause the switch 520 to couple the cable transmission medium 503 to a connector transmission medium 504*a* when the cable isolation actuator 510 and the coupling 511 are actuated by a solenoid 512 (e.g., when a force is applied to the cable isolation actuator 510 and the coupling 511 by the solenoid 512 that exceeds a force generated in the opposite direction by a biasing element 518). In the embodiment illustrated in FIG. 5E, the biasing element 518 is coupled to the cable isolation actuator 510 and operates to bias the cable isolation actuator 510 such that the coupling 511 between the cable isolation actuator 510 and the switch 520 causes the switch 520 to decouple the cable transmission medium 503 from the connector transmission medium 504*a* when the cable isolation actuator 510 and the coupling 511 is actuated (e.g., when force is applied to the cable isolation actuator 510 and coupling 511 by the biasing element 518 that is greater than an opposite force applied to the cable isolation actuator 510 and the coupling 511 by the solenoid 512). While the biasing element 518 is illustrated as a spring in FIGS. 5D and 5E, one of skill in the art in possession of the present disclosure will recognize that other biasing elements and/or techniques for providing similar functionality will fall within the scope of the present disclosure as well. Furthermore, while the switch 520 is illustrated, one of skill in the art in possession of the present disclosure will recognize that the switch 520 is optional, and the solenoid 512 or other actuation device may couple the cable transmission medium 503 to the connector transmission medium 504*a*, as illustrated in FIG. 5C.

In the illustrated embodiment, an actuator lock mechanism 516 is coupled to the cable isolation actuator 510, and operates to engage the cable isolation actuator 510 and hold the cable isolation actuator 510 in position following a biasing of the cable isolation actuator 510 that causes the switch 520 to decouple the cable transmission medium 503 from the connector transmission medium 504a, discussed in further detail below. In some examples, the actuator lock mechanism 516 may be configured to provide a greater force in combination with the force generated by the biasing element 518 on the cable isolation actuator 510 than the force generated in the opposite direction by the solenoid 512 when the solenoid 512 is activated. As such, a manual force on the cable isolation actuator 510 in the direction of the force generated by the solenoid may be needed to overcome the force generated by the actuator lock mechanism 516 and biasing element 518 in order to cause the switch 520 to couple the cable transmission medium 503 to the connector transmission medium 504a.

In a specific embodiment, the biasing element 518 and/or the actuator lock mechanism 516 may be provided with the cable isolation actuator 510 and the coupling 511 as part of a "push-push button" that operates via a first force that is applied to the cable isolation actuator 510 and the coupling 511 (and then removed) to decouple the cable transmission medium 503 from the connector transmission medium 504a via the switch 520, and keep the cable transmission medium 503 decoupled from the connector transmission medium 504a until a second force is then applied to the cable isolation actuator 510 to cause the switch 520 to recouple the cable transmission medium 503 to the connector transmission medium 504a. However, one of skill in the art in possession of the present disclosure will recognize that other isolation actuator biasing/locking mechanisms will fall within the scope of the present disclosure as well. For example, the biasing element 518 and the solenoid 512 may provide forces in directions that are opposite what is described above such that the biasing element 518 causes the switch 520 to couple the cable transmission medium 503 to the connector transmission medium 504a via the cable isolation actuator 510, while the solenoid 512 causes the switch 520 to decouple the cable transmission medium 503 from the connector transmission medium 504a via the cable isolation actuator 510. Furthermore, as discussed below, in some embodiments the isolation actuator biasing/locking mechanism may be omitted from the cable isolation device 508 while remaining with the scope of the present disclosure as well.

In various embodiments, the cable isolation device 508 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a cable isolation engine 514 that is configured to perform the functionality of the cable isolation engines and cable isolation devices discussed below. As illustrated, the cable isolation engine 514 may be coupled to the cable transmission medium 503 and/or the connector transmission medium 504a. However, in other embodiments, the cable isolation engine 514 may be coupled to a dedicated cable management transmission medium (not illustrated) that may be included in the cable 501, the connector 504, and/or the connector 506 in order to allow the cable isolation engine 514 to receive data and/or power from a computing device. In other embodiments, the cable isolation device 508 may be coupled directly to a dedicated cable management transmission medium in order to allow the solenoid 512 to be controlled directly by the computing device.

In various embodiments, the cable isolation system 500 may also include one or more communication systems. In the illustrated embodiment, a communication system 522 is included in the connector 504. However, one of skill in the art in possession of the present disclosure will recognize that the communication system 522 may be alternatively included in the connector 506 or the cable 501, and/or a plurality of communication systems may be included in the cable isolation system 500 such that the communication systems are located in the cable body 502 at different positions along its length. In the embodiments discussed below, the communication system 522 may be provided using Near Field Communication (NFC) systems that may each include an NFC processing device, an NFC memory device, and/or a variety of other NFC components known in the art. However, other communication systems such as, for example, Bluetooth communication systems, Bluetooth Low Energy (BLE) communication systems, Wi-Fi Direct communication systems, wired communication systems that transmit communications via the cable transmission medium 503 and/or connector transmission medium 504a, and/or a variety of other communication systems that are capable of providing the functionality discussed below will fall within the scope of the present disclosure as well.

In some embodiments, the communication system 522 may be provided with cable information about the cable isolation system 500 in a storage that is accessible by the communication system 522. For example, during the manufacture of the cable isolation system 500, prior to the sale of the cable isolation system 500, prior to the deployment of the cable isolation system 500 in a networked system (discussed below), during or subsequent to the deployment of the cable isolation system 500 in a networked system, and/or at a variety of other times that will be apparent to one of skill in the art in possession of the present disclosure, the communication system 522 may be used to receive and store cable information. For example, cable information may include a cable identifier identifying and/or distinguishing the cable isolation system 500 from other cable isolation systems; cable length information that describes the length of the cable 501; cable quality information that describes category characteristics of the cable 501, the connector characteristics of the cable isolation system 500, the transmission rate characteristics of the cable isolation system 500, the data transmission medium characteristics of the cable isolation system 500, the rated bandwidth of the cable isolation system 500, a state of the cable isolation device 508 (e.g., isolated or non-isolated), and/or a variety of other cable quality characteristics known in the art; and/or any other information about the cable that may be available prior to the deployment and/or during the deployment of the cable isolation system 500 in a networked system (i.e., to couple together computing devices.) As such, the communication system 522 in the cable isolation system 500 may store cable information that provides details about the cable isolation system 500. In some embodiments, at least a portion of the cable information may be stored in a write-protected area of the communication system memory such that it cannot be written over or otherwise erased.

The cable isolation device 508 and its components may be powered in a variety of ways in different embodiments. In some embodiments, the cable isolation device 508 in the cable isolation system 500 may be powered using a battery or other portable power supply. In other embodiments, the cable isolation device 508 may be powered through the connectors 504 and 506. For example, the connectors 504 and 506 may be configured to receive power through ports on computing device when the connectors 504 and 506 are coupled to those ports (discussed in further detail below), and those connectors 504 and/or 506 may provide power received through the ports to the cable isolation device 508. In yet other embodiments, the cable isolation device 508 may be powered through a power transmission medium in the cable isolation system 500. For example, the cable isolation system 500 may include a Power over Ethernet (PoE, PoE+, etc.) cable that is configured to receive power through ports on computing device when the connectors 504 and 506 are coupled to those ports (discussed in further detail below), and transmit that power over a data/power transmission medium (e.g., the cable transmission medium 503) in the cable body 502, and the cable isolation device 508 may be coupled to the data/power transmission medium such that the cable isolation device 508 may draw power from the data/power transmission medium. However, while a few examples have been provided, one of skill in the art in possession of the present disclosure will recognize that the cable isolation device 508 may be powered in a variety of manners that would be apparent to one of skill in the art in possession of the present disclosure. Furthermore, while a specific cable isolation system 500 has been illustrated, one of skill in the art in possession of the present disclosure will recognize that cable isolation systems (or other devices operating according to the teachings of the present disclosure in a manner similar to that described below for the cable isolation system 500) may include a variety of components and/or component configurations for providing conventional cable functionality, as well as the functionality discussed below, while remaining within the scope of the present disclosure as well.

Referring now to FIG. 6, an embodiment of a method 600 for isolating a cable is illustrated. As discussed below, the systems and methods of the present disclosure provide for the isolation of cables and/or the computing devices connected to them by providing a cable isolation system that couples the computing device together. The cable isolation system includes a cable isolation device that may be provided in a cable and/or in one or more connectors included in the cable isolation system, and that may operate to transition from a non-isolated state to an isolated state in order to prevent data from being transmitted between computing devices coupled together by cable isolation system. The cable isolation system may also include an actuator lock mechanism that locks the cable isolation device in an isolated state after transitioning from the non-isolated state such the cable isolation device can only be transitioned from the isolated state to the non-isolated state manually by a user via the physical engagement of the cable isolation device by the user, which prevents unwanted third parties from remotely transitioning the cable isolation system to the non-isolated state. As such, a computing device in a networked system that an administrator would like to isolate from the networked system may be quickly isolated by the administrator by remotely transmitting an isolation signal to the cable isolation device that causes the cable isolation device to transition from the non-isolated state to the isolated state. Subsequently, the computing device may remain powered and isolated from the networked system so that an administrator may service the computing device remotely via an out-of-band management connection (or locally) without that computing device affecting the networked system (e.g., in cases where that computing device has been compromised.)

Figure 7:
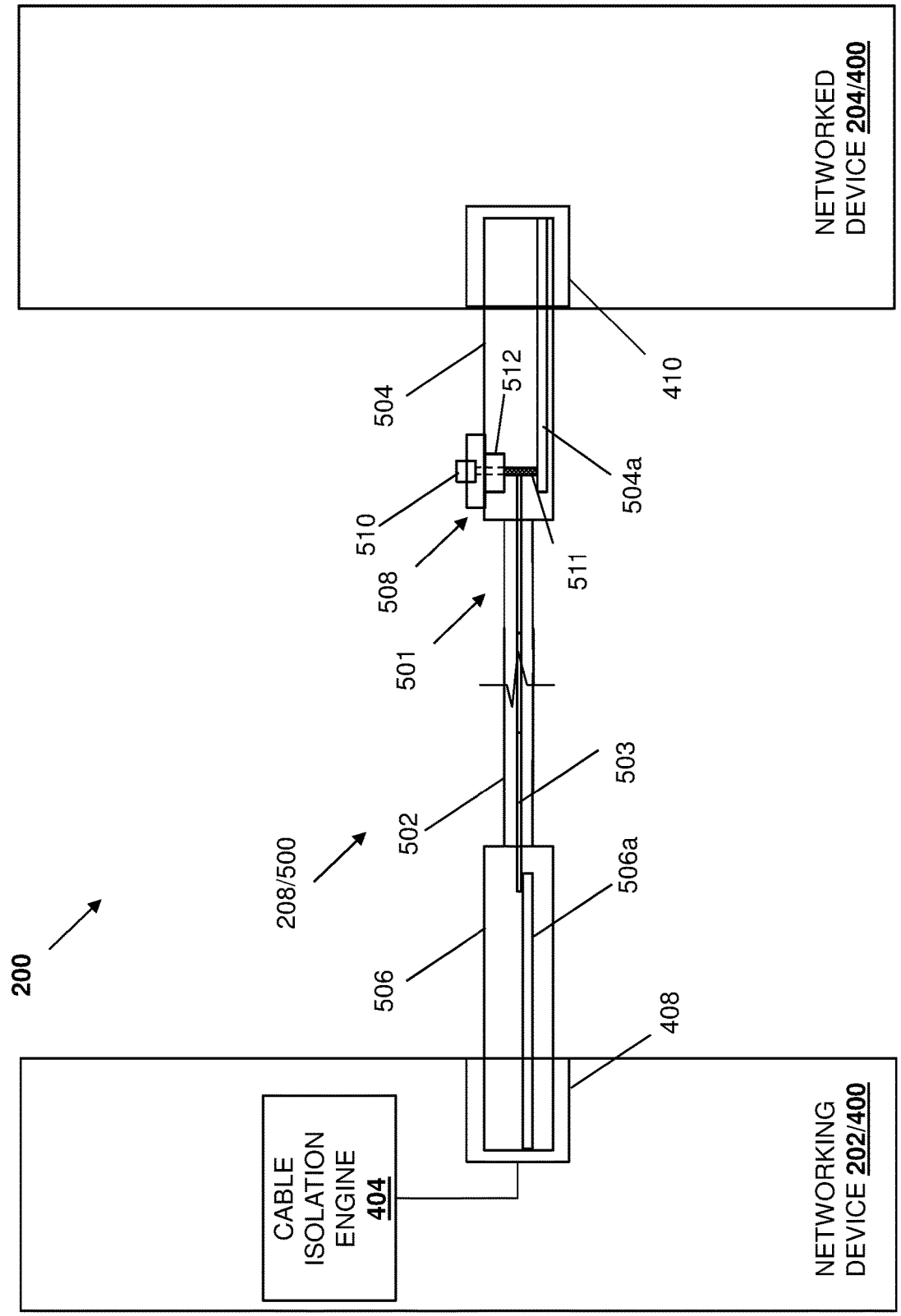
FIG. 7 is a schematic view illustrating an embodiment of the cable isolation system of FIGS. 5A-5E operating during the method of FIG. 6.

Referring now to FIGS. 2, 3, 4, 5A-5E, 6, and 7, the method 600 begins at block 602 where computing devices are coupled together using a cable isolation system. FIG. 7 illustrates the networked system 200 that is provided using the cable isolation system 208/500 to couple together the networking device 202 and the networked device 204. In the illustrated embodiment, the connector 506 on the cable isolation system 208/500 has been engaged with the port 408 on the networking device 202/400, and the connector 504 on the cable isolation system 208/500 has been engaged with the port 410 on the networked device 204/400 in order to couple the networking device 202 to the networked device 204. In some embodiments, the cable body 502 of the cable 501 in the cable isolation system 208/500 that extends between the networking device 202 and the networked device 204 to couple them together may be relatively long (25 meters, 50 meters, 100 meters, and more), and may run through computing device racks, ceilings, between floors of a building, between buildings, and/or otherwise may couple together remotely positioned computing devices. However, in other embodiments, the cable body 502 may be relatively short (20 meter, 10 meters, 5 meters, 1 meter, and less), and may couple together relatively closely positioned computing devices.

When connected to the networking device 202/400 and the networked device 204/400, the cable isolation device 508 may be in the non-isolated state such that the cable isolation device 508 couples the cable transmission medium 503 to the connector transmission medium 504a to allow data and/or power to be transmitted between the connector 504 and the connector 506 via the cable transmission medium 503, the connector transmission medium 504a, and a connector transmission medium 506a. As discussed above, in some examples the connector 504 and the connector 506 may be dongles that may communicate via a wireless transmission medium using a wireless transmission protocol such that no physical cable and physical cable transmission medium is utilized, and rather a "logical cable" is provided between the connectors 504 and 406 via a wireless transmission medium. Thus, one of skill in the art in possession of the present disclosure will recognize that the cable isolation device 508 may be configured to provide an isolated state or a non-isolated state between a wireless transceiver included in the connector 504 or 506 and the wireless transmission medium provided by that connector 504 or 506.

The method 600 then proceeds to block 604 where a computing device retrieves cable isolation system information from a cable isolation system. Referring to FIG. 7, the cable isolation engine 404 in the networking device 202/400 may detect the connection of the connector 506 on the cable isolation system 208/500 to the port 408 on the networking device 202/400, and may identify an identifier for the port 408 on the networking device 202/400 (e.g., a "networking device port identifier" for the port 410, which may include a port number, an address, and/or a variety of other identifiers known in the art). In addition, the communication system 406 in the networking device 202/400 may communicate with the communication system 522 in the cable isolation system 208/500, with the communication between the communication system 406 and the communication system 522 including an exchange of an identifier for the cable isolation system 208/500 that may include a global identifier that is unique to the cable isolation system 208/500. In addition, the communication between the communication system 406 and the communication system 522 in the cable isolation system 208/500 may exchange any other information stored in or accessible to the communication system 522 such as, for example, an identifier that is unique to the connectors 504 and/or 506, information about the cable isolation system 208/500 (e.g., the length of the cable body 502, the type of the cable isolation system (e.g., Ethernet, Fibre, etc.), the transmission capabilities of the cable isolation system 208/500, the isolation capabilities of the cable isolation system 208/500, an isolation state (e.g., non-isolated, isolated) of the cable isolation system 208/500, an identifier for the computing device (e.g., an identifier of the networked device 204) to which the other connector of the cable isolation system 208/500 is connected, and/or any other cable isolation system information that would be apparent to one of skill in the art in possession of the present disclosure), and/or a variety of other information that would be apparent to one of skill in the art in possession of the present disclosure.

In some embodiments, the information obtained from the cable isolation system 208/500 may be stored by the networking device 202/400 in the cable isolation mapping table 418a such that the cable isolation mapping table 418a includes a mapping of at least the identifier for the port 408 and an identifier for the networked device 204 that is coupled to that port 408. Furthermore, in some embodiments, the cable isolation mapping table 418a may also include an identifier for the cable isolation system 208/500, an isolation state for the cable isolation system 208/500, and/or any of the other information discussed above. In various embodiments, the networking device 202/400 may share the information in the cable isolation mapping table 418a with the network management device 206. For example, the network management device 206 may maintain the management database 306 that maps which computing devices in the networked system 200 are connected to each other via a cable isolation system 208/500, the states of those cable isolation systems, and other information that would be apparent to one of skill in the art in possession of the present disclosure. In a specific example, the management database 206 may maintain a mapping of identifiers for computing devices that are coupled together by the cable isolation system 208 (e.g., a mapping of the networking device 202 and the networked device 204 in the example provided above.)

Figure 8:
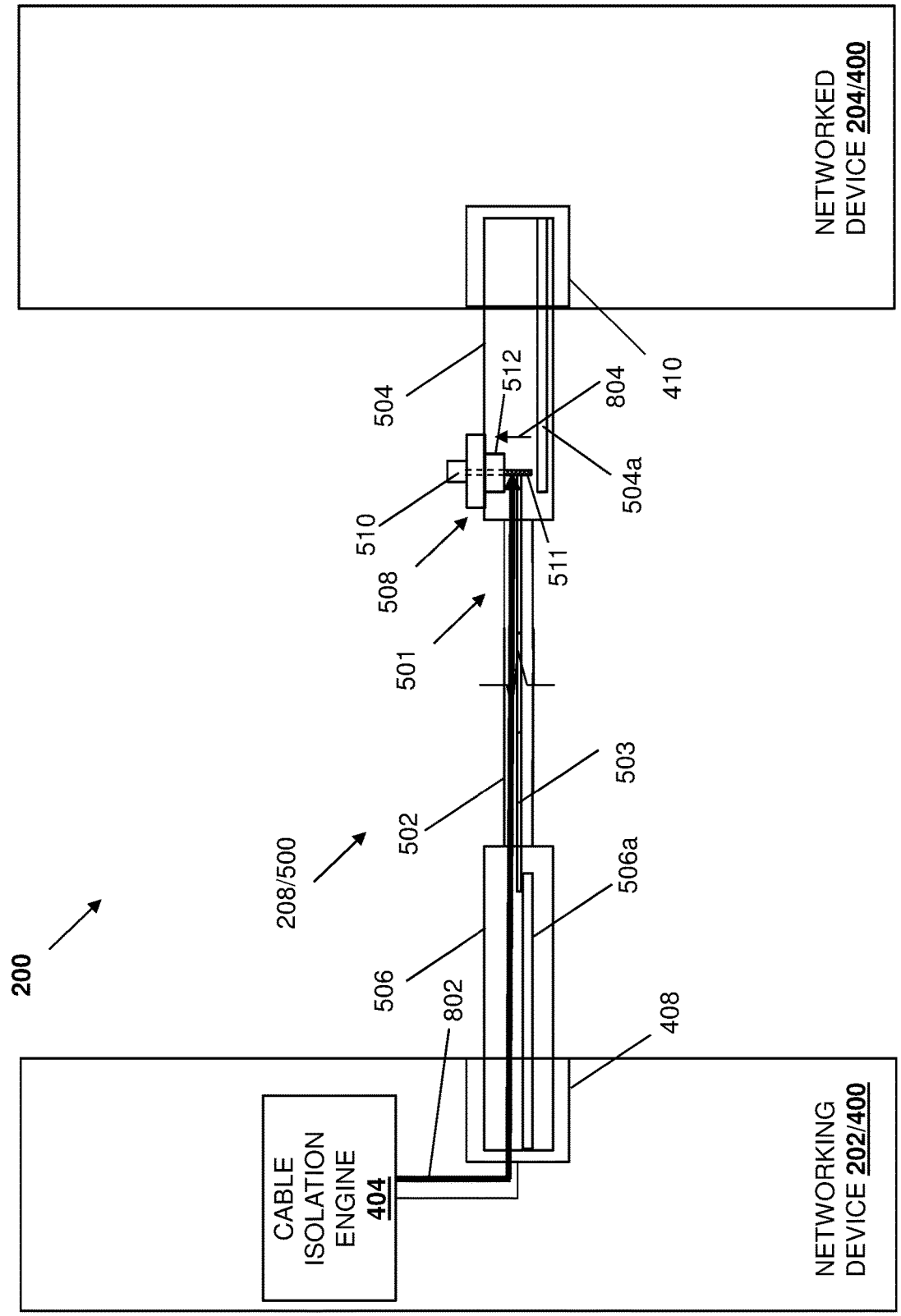
FIG. 8 is a schematic view illustrating an embodiment of the cable isolation system of FIGS. 5A-5E operating during the method of FIG. 6.

The method 600 may then proceed to block 606 where the cable isolation system transitions from a non-isolated state to an isolated state. In an embodiment, at block 606, the cable isolation system 208/500 may transmit data and/or power between the networking device 202/400 and the networked device 204 while in the non-isolated state. For example, during data/power transmission, the cable isolation system 208/500 may transition from the non-isolated state to the isolated state. In the example illustrated in FIG. 8, the cable isolation device 508 may receive an isolation signal 802 from the cable isolation engine 404 in the networking device 202/400 that causes the cable isolation device 508 to transition from the non-isolated state to the isolated state. In some embodiments, the isolation signal 802 may be generated by the cable isolation engine 404 in response to receiving isolation instructions from the management engine 304 to isolate the networked device 204 from the networked system 200. For example, the management engine 304 may receive an input or other indication from a user, a log file, or other source, that the networked device 204 needs to be isolated from the networked system 200 (e.g., the networked device 204 is corrupted or compromised). In response, the management engine 304 may determine from the computing device mappings in the management database 306 that the networked device 204 is coupled to the networking device 202 via a cable isolation system 208, and may provide isolation instructions via the management cable 210 to the networking device 202 to isolate itself from the networked device 204. Furthermore, the management engine 304 may provide the isolation instructions to any other networking device that is coupled to the networked device 204 as well. In some embodiments, the cable isolation engine 404 in the networking device 202 may then reference the cable isolation mapping table 418a using the identifier for the networked device 204 to determine which of its ports are coupled to the networked device 204. In the illustrated example, the cable isolation engine 404 may determine, using the cable isolation mapping table 418a, that the port 408 is connected to the networked device 204, and may then provide the isolation signal 802 via the port 408 to the cable isolation system 208/500.

As discussed above, in some embodiments the isolation signal 802 may be transmitted via the connector transmission medium 506a and the cable transmission medium 503 such that the isolation signal 802 is received by the cable isolation device 508. However, in other embodiments, the isolation signal 802 may be provided via a dedicated isolation transmission medium such that the isolation signal 802 is not transmitted on the same transmission medium in the cable isolation system 208/500 that is used to transmit the data/power discussed above. In various embodiments, the cable isolation engine 404 may control the transitioning from the non-isolated state to the isolated state directly. However, in other embodiments, the cable isolation engine 404 may operate in conjunction with the cable isolation engine 514 to control the transitioning from the non-isolated state to the isolated state, with the cable isolation engine 514 receiving the isolation signal 802 and causing the cable isolation device 508 to transition from the non-isolated state to the isolated state.

In various embodiments, the isolation signal 802 may cause the cable isolation actuator 510 to be actuated to transition the cable isolation device 508 from the non-isolated state to the isolated state. For example, the isolation signal 802 may cause the solenoid 512 to remove a force that the solenoid 510 provides on the cable isolation actuator 510 while the cable isolation device 508 is in a non-isolated state in order to cause the switch 520 to couple the connector transmission medium 504a to the cable transmission medium 503. As will be appreciated by one of skill in the art in possession of the present disclosure, the removal of the force provided by the solenoid 512 may allow the biasing element 518, which provides a force on the cable isolation actuator 510 that is less than and opposite the force provided by the solenoid 512 when the cable isolation device 508 is in the non-isolated state, to provide a force on the cable isolation actuator 510 that is greater than and opposite the force provided by the solenoid 512, which causes the biasing element 518 to bias the cable isolation actuator 510 in the direction 804 such that the switch 520 decouples the connector transmission medium 504a from the cable transmission medium 503.

In various embodiments, the cable isolation system 208/500 may transition from the non-isolated state to the isolated state without the isolation signal 802. For example, the cable isolation actuator 510 may be configured to be actuated manually by a user to transition the cable isolation device 508 between the non-isolated state and the isolated state. For example, a user may press the cable isolation actuator 510 such that force provided by the solenoid 512 is removed from the cable isolation actuator 510 and the biasing element 518 provides a force to cause the switch 520 (or an alternative switch that couples the connector transmission medium 504a to the cable transmission medium 503) to decouple the connector transmission medium 504a from the cable transmission medium 503. While various examples of transitioning the cable isolation system 208/500 from the non-isolated state to the isolated state have been illustrated and described, one of skill in the art in possession of the present disclosure will recognize that the cable isolation system 208/500 may be transitioned from a non-isolated state to the isolated state using other techniques while remaining within the scope of the present disclosure as well. For example, the isolation signal 802 may cause a fuse in the cable isolation device 508 that couples the connector transmission medium 504a to the cable transmission medium 503 to blow such that the cable isolation system 208/500 isolates any devices connected via the cable isolation system 208/500 from each other (e.g., to isolate a computing device from the networked system 200.)

Figure 9A:
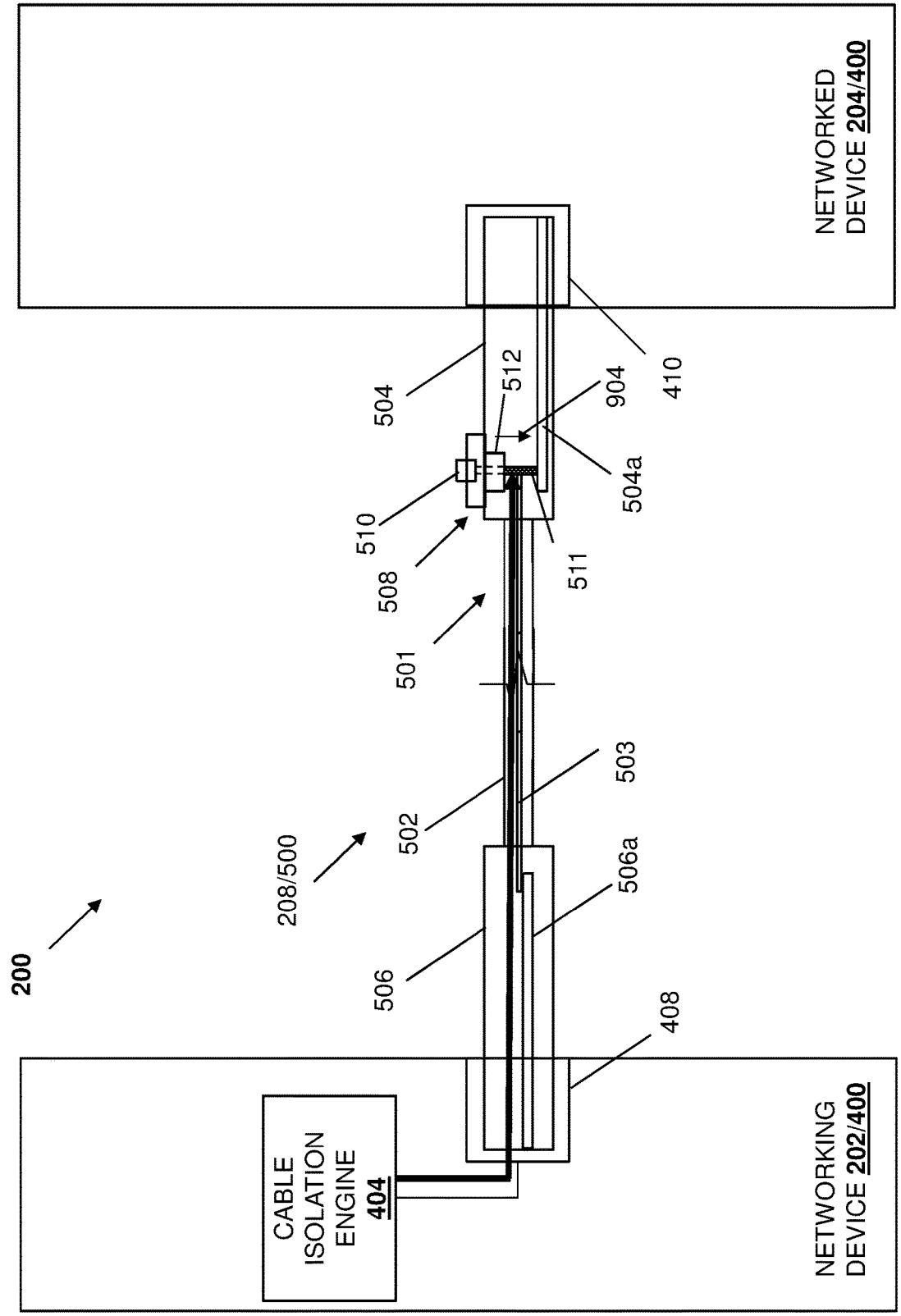
FIG. 9A is a schematic view illustrating an embodiment of the cable isolation system of FIGS. 5A-5E operating during the method of FIG. 6.

The method 600 then proceeds to block 608 where the cable isolation system transitions from an isolated state to a non-isolated state. In an embodiment, at block 608, an administrator may want to reconnect the networked device 204 to the networked system 200 after it has been isolated, and/or otherwise may wish to provide the cable isolation device 208/500 in the non-isolated state. For example, the administrator may have fixed a security issue associated with the networked device 204, and thus may determine that it is safe to reconnect the networked device 204 to the networked system 200. In the embodiment illustrated in FIG. 9A, the cable isolation device 508 may receive a reconnection signal 902 from the cable isolation engine 404 in the networking device 202/400 that causes the cable isolation device 508 to transition from the isolated state to the non-isolated state. For example, the reconnection signal 902 may be generated by the cable isolation engine 404 in response to receiving reconnection instructions from the management engine 304 to recouple the networked device 204 to the networked system 200, with the management engine 304 receiving an input or other indication from the administrator that the networked device 204 needs to be recoupled to the networked system 200 (e.g., the corruption on the networked device 204 has been fixed). In response, the management engine 304 may determine from the computing device mappings in the management database 306 that the networked device 204 is coupled to the networking device 202 via the cable isolation system 208 and may provide the reconnection instructions via the cable 210 to the networking device 202 to recouple to the networked device 204. Furthermore, the management engine 304 may provide the reconnection instructions to any other networking device that is coupled to the networked device 204 as well. The cable isolation engine 404 of the networking device 202 may then reference the cable isolation mapping table 418a using the identifier for the networked device 204 that was received in the reconnection instructions and may determine which ports are coupled to the networked device 204. In the illustrated example, the cable isolation engine 404 may determine, using the cable isolation mapping table 418a, that the port 408 is connected to the networked device 204 via the cable isolation system 208 that is in the isolated state and may provide the reconnection signal 902 via the port 408 to the cable isolation system 208.

As discussed above, the reconnection signal 902 may be transmitted via the connector transmission medium 506a and the cable transmission medium 503 such that the reconnection signal 902 is received by the cable isolation device 508. However, in other embodiments, the reconnection signal 902 may be provided on a dedicated isolation transmission medium such that the reconnection signal 902 is not transmitted on the same transmission medium in the cable isolation system 208/500 as is used to transmit the data/power as discussed above. In various embodiments, the cable isolation engine 404 may control the transitioning from the isolated state to the non-isolated state directly. However, in other embodiments, the cable isolation engine 404 may operate in conjunction with the cable isolation engine 514 to control the transitioning from the isolated state to the non-isolated state, with the cable isolation engine 514 receiving the reconnection signal 902 and causing the cable isolation device 508 to transition from the isolated state to the non-isolated state.

In various embodiments, the reconnection signal 902 may cause the cable isolation actuator 510 to be actuated to transition the cable isolation device 508 from the isolated state to the non-isolated state. For example, the reconnection signal 902 may cause the solenoid 512 to apply a force on cable isolation actuator 510 that is greater than a force that is provided by the biasing element 518 on the cable isolation actuator 510 (while the cable isolation device 508 is in the isolated state) that causes the switch 520 to decouple the connector transmission medium 504a from the cable transmission medium 503. As will be appreciated by one of skill in the art in possession of the present disclosure, the provisioning of the force by the solenoid 512 may overcome the force provided by the biasing element 518 in the opposite direction on the cable isolation actuator 510, and may cause the biasing element 518 to compress and the cable isolation actuator 510 to move in the direction 904 such that the switch 520 couples the connector transmission medium 504a to the cable transmission medium 503.

Figure 9B:
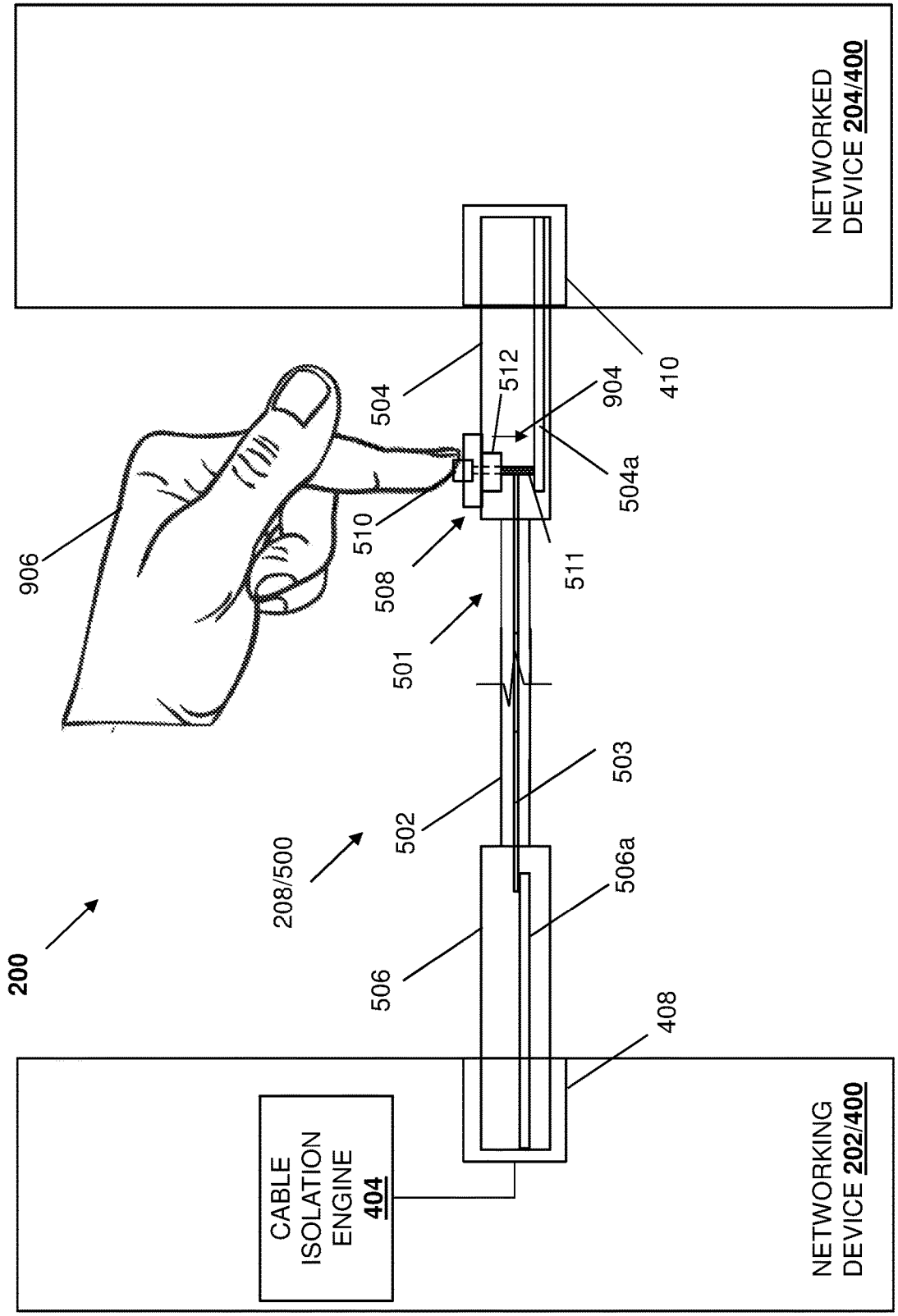
FIG. 9B is a schematic view illustrating an embodiment of the cable isolation system of FIGS. 5A-5E operating during the method of FIG. 6.

In various embodiments, the cable isolation system 208/500 may transition from the non-isolated state to the isolated state without the reconnection signal 902. For example, as illustrated in FIG. 9B, the cable isolation actuator 510 may be configured to be actuated manually by a user 906 to transition the cable isolation device 508 between the non-isolated state and the isolated state. For example, a user 906 may press the cable isolation actuator 510 such that a force provided by the biasing element 518 on the cable isolation actuator 510 is overcome by the force provided by the user 906 to actuate of the cable isolation actuator 510 and cause the switch 520 to recouple the connector transmission medium 504a to the cable transmission medium 503.

In various embodiments, the actuator lock mechanism 516 may be configured such that when the cable isolation system 208/500 is in the isolated state, no non-isolation signal can transition the cable isolation device 508 from the isolated state to the non-isolated state. For example, such functionality may be provided to prevent a compromised computing device in the networked system 200 from providing a reconnection signal to the cable isolation system 208/500 to recouple the compromised computing device to the networked system 200. In various embodiments, the actuator lock mechanism 516 may permanently lock the cable isolation system 208/500 in an isolated state such that cable isolation system 208/500 must be replaced to reconnect the networked device 202 to the networking device 204. In other examples, the actuator lock mechanism 516 may provide a force that is greater than and opposite to the force provided by the component (e.g., the solenoid 512) on the cable isolation actuator 510 that causes the switch 520 to couple the connector transmission medium 504a to the cable transmission medium 503. In some examples, the force provided by the actuator lock mechanism 516 may only be overcome by the user 906 providing a manual force on the cable isolation actuator 510 that is greater than and opposite to the force provided by the actuator lock mechanism 516.

However, while various examples of transitioning the cable isolation system 208/500 from the isolated state to the non-isolated state have been illustrated, one of skill in the art in possession of the present disclosure will recognize that the cable isolation system may be transitioned from a isolated state to the non-isolated state using other techniques while remaining within the scope of the present disclosure as well.

Thus, systems and methods have been described that provide for isolation of a cable or a device connected to that cable without the need to power down that device or manually remove the cables from the device. Using the systems and the methods of the present disclosure a user may isolate the cable or the device connected to that cable by providing an isolation signal to a cable isolation device provided in the cable (and/or a connector coupled to the cable) that causes the cable isolation device to transition from a non-isolated state to an isolated state that prevents data and/or power from being transmitted via the cable to/from the device that is being isolated. As such, the user may remotely isolate the device from a networked system without having to physically locate the device, and may leave the isolated device running such that an administrator may service the device while it is isolated from the networked system. The user may then reconnect the device to the networked system by providing a reconnection signal to transition the cable isolation device into the non-isolated state. In some embodiment, transitioning of the cable isolation device from the isolated state to the non-isolated state may require a user to manually actuate the cable isolation device, which prevents a compromised device from providing an unauthorized reconnection signal to the cable isolation device.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A cable isolation system, comprising:
   a cable that includes a first end, a second end that is opposite the cable from the first end, and at least one cable transmission medium that extends between the first end and the second end and that is configured to transmit data;
   a first connector that is located on the first end of the cable, that is coupled to the at least one cable transmission medium, and that is configured to couple the cable to a first computing device;
   a second connector that is located on the second end of the cable, that is coupled to the at least one cable transmission medium, and that is configured to couple the cable to a second computing device; and
   a cable isolation device that is provided in at least one of the cable, the first connector, or the second connector;
   a processing system that is coupled to the cable isolation device and that is configured to:
      receive an isolation signal from the first computing device when the first computing device is coupled to the first connector and the cable isolation device is provided in a non-isolated state that allows data to be transmitted between the first connector and the second connector via the cable transmission medium; and
      transition, in response to receiving the isolation signal, the cable isolation device from the non-isolated state to an isolated state that prevents data from being transmitted between the first connector and the second connector via the cable transmission medium.

2. The cable isolation system of claim 1, wherein the cable isolation device includes a cable isolation device actuator, and wherein the cable isolation device actuator is configured to be actuated to transition the cable isolation device between the non-isolated state and the isolated state.

3. The cable isolation system of claim 1, wherein the processing system is configured to receive the isolation signal via a dedicated isolation transmission medium that is separate from the at least one cable transmission medium.

4. The cable isolation system of claim 1, wherein the cable isolation device is configured to prevent transition from the isolated state to the non-isolated state subsequent to the processing system transitioning the cable isolation device from the non-isolated state to the isolated state.

5. The cable isolation system of claim 1, wherein the processing system is configured to:
   advertise a state of the cable isolation device to the first computing device.

6. The cable isolation system of claim 1, wherein the processing system is configured to:
   receive a reconnection signal from the first computing device when cable isolation device is provided in the isolated state; and
   transition, in response to receiving the reconnection signal, the cable isolation device from the isolated state to the non-isolated state.

7. The cable isolation system of claim 1, wherein the cable isolation device includes a cable isolation device actuator, and wherein the cable isolation device is configured to only transition from the isolated state to the non-isolated state in response to an actuation of the cable isolation device actuator.

8. An Information Handling System (IHS) network, comprising:
   a first device;
   a second device;
   a cable that includes a first end, a second end that is opposite the cable from the first end, and at least one cable transmission medium that extends between the first end and the second end and that is configured to transmit data;
   a first connector that is located on the first end of the cable and that is coupled to the first device;
   a second connector that is located on the second end of the cable and that is coupled to the second device; and
   a cable isolation device that is provided in at least one of the cable, the first connector, or the second connector;
   a processing system that is coupled to the cable isolation device and that is configured to:
      receive an isolation signal from the first device when the cable isolation device is provided in an isolated state that allows data to be transmitted between the first device and the second device; and
      transition, in response to receiving the isolation signal, the cable isolation device from the non-isolated state to a non-isolated state that prevents data from being transmitted between the first device and the second device.

9. The IHS network of claim 8, wherein the cable isolation device includes a cable isolation device actuator, and wherein the cable isolation device actuator is configured to be actuated to transition the cable isolation device between the non-isolated state and the isolated state.

10. The IHS network of claim 8, wherein the processing system is configured to receive the isolation signal via a dedicated isolation transmission medium that is separate from the at least one cable transmission medium.

11. The IHS network of claim 8, wherein the cable isolation device is configured to prevent transition from the isolated state to the non-isolated state subsequent to the processing system transitioning the cable isolation device from the non-isolated state to the isolated state.

12. The IHS network of claim 8, wherein the processing system is configured to:
 advertise a state of the cable isolation device to the first device.

13. The IHS network of claim 8, wherein the processing system is configured to:
 receive a reconnection signal from the first device when cable isolation device is provided in the isolated state; and
 transition, in response to receiving the reconnection signal, the cable isolation device from the isolated state to the non-isolated state.

14. The IHS network of claim 8, wherein the cable isolation device includes a cable isolation device actuator, and wherein the cable isolation device is configured to only transition from the isolated state to the non-isolated state in response to an actuation of the cable isolation device actuator.

15. A method of isolating a cable, comprising:
 receiving, by a processing system coupled to a cable isolation device included in a cable that couples a first computing device with a second computing device, an isolation signal from the first computing device when the cable isolation device is provided in a non-isolated state that allows data to be transmitted between the first computing device and the second computing device; and
 transitioning, by the processing system in response to receiving the isolation signal, the cable isolation device from the non-isolated state to an isolated state that prevents data from being transmitted between the first computing device and the second computing device.

16. The method of claim 15, wherein the non-isolated state allows data to be transmitted between the first computing device and the second computing device via at least one cable transmission medium included in the cable, and the isolated state prevents data from being transmitted between the first computing device and the second computing device via the at least one cable transmission medium.

17. The method of claim 15, further comprising:
 actuating a cable isolation device actuator that is included in the cable isolation device to transition the cable isolation device between the non-isolated state and the isolated state.

18. The method of claim 15, further comprising:
 preventing, by the cable isolation device, transition from the isolated state to the non-isolated state subsequent to the transitioning the cable isolation device from the non-isolated state to the isolated state.

19. The method of claim 15, further comprising:
 receiving, by the processing system, a reconnection signal from the first computing device when cable isolation device is provided in the isolated state; and
 transitioning, by the processing system in response to receiving the reconnection signal, the cable isolation device from the isolated state to the non-isolated state.

20. The method of claim 15, further comprising:
 transitioning from the isolated state to the non-isolated state only in response to a mechanical actuation of a cable isolation device actuator.

* * * * *